Sept. 20, 1971 H. L. F. ENLUND ET AL 3,606,218
SOUND AND VIBRATION ISOLATION SUPPORT
Filed March 21, 1969
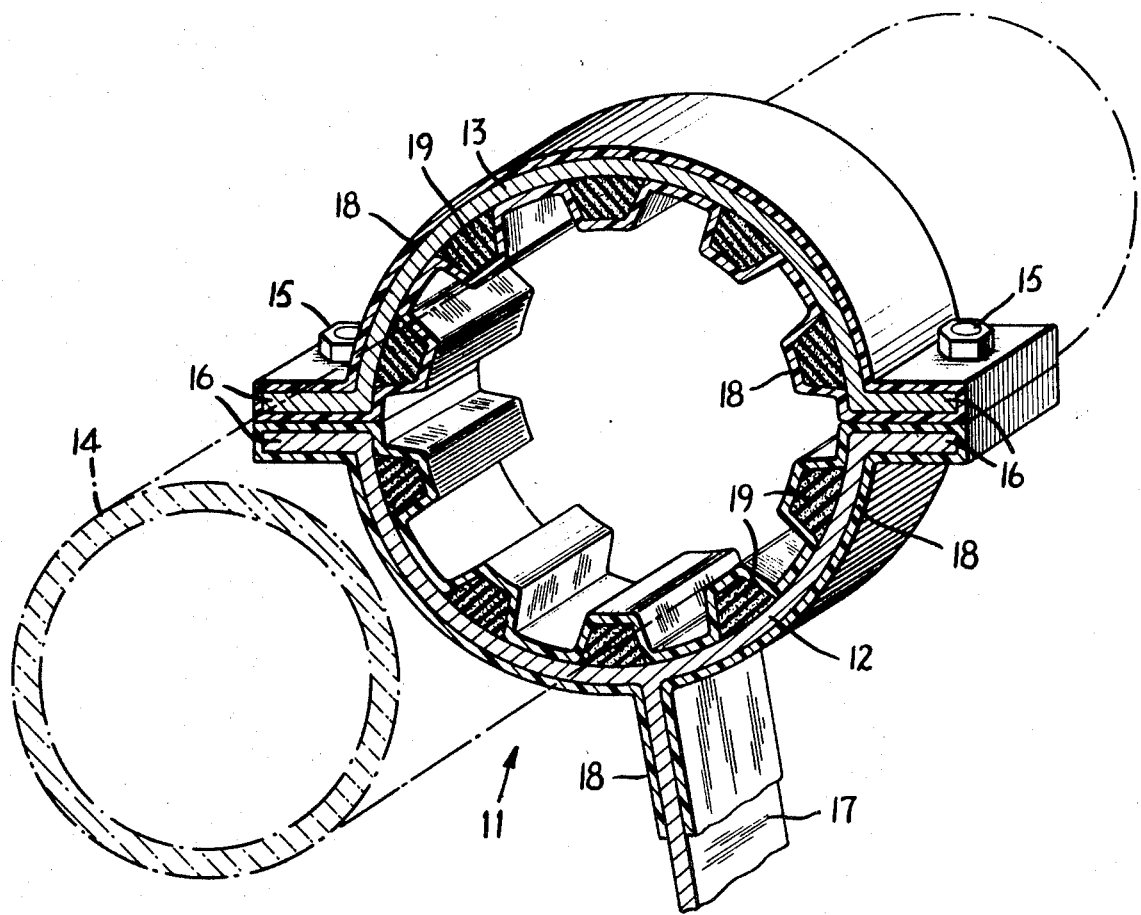
INVENTORS
HELMER L. F. ENLUND &
BY ENOS V. STANHOPE
Brumbaugh, Graves, Donohue & Raymond
their ATTORNEYS United States Patent Office 3,606,218
Patented Sept. 20, 1971

3,606,218
SOUND AND VIBRATION ISOLATION SUPPORT
Helmer L. F. Enlund, Waterford, and Enos V. Stanhope, Groton, Conn., assignors to General Dynamics Corporation, New York, N.Y.
Filed Mar. 21, 1969, Ser. No. 809,287
Int. Cl. F16l 3/10
U.S. Cl. 248—74
1 Claim

ABSTRACT OF THE DISCLOSURE

In the particular embodiment of the invention described herein, a pipe hanger comprises a metal strap, with a plurality of strips of resilient meaterial attached to the inner surface of the strap, the strap and the resilient strips being encapsulated by a coating of elastomeric material.

BACKGROUND OF THE INVENTION

This invention relates to sound and vibration absorbing supports and, more particularly, to an improved pipe hanger assembly designed to absorb vibrations generated by pipes or similar objects and thus prevent their transmission to supporting structures.

Various types of pipe hangers and other supports are currently being used in efforts to provide secure support while at the same time reducing the effects of pipe vibration. The hangers generally utilize an arrangement which includes a metal strap in combination with one or more insulating materials. One common type employs a flat metal strap shaped to fit a pipe and having a liner material of rubber or asbestos. A second type consists of an elastomer block sectioned and fitted to a group of pipes and supported in a metal frame. A third kind is a spool mounted hanger having two concentric sleeves joined by an elastomer in the annulus. Another common hanger has spring-like elastomer mounts which apply compressive or tensile loading to the elastomer.

The above known methods are similar in their disadvantages. They require extensive fitting of elastomers and asbestos liners in the clamping devices. The hand fitting of liner material leads to high installation costs. In addition, galvanizing of the various metal parts is usually required to prevent corrosion.

It is therefore, an object of this invention to provide a sound and vibration isolation support which can be easily and quickly assembled.

It is another object of this invention to provide a support of the above character having a minimum number of elements, all of which may be inexpensively and quickly mass produced.

It is a further object of this invention to provide a hanger structure which will reduce the transmission of vibration from pipes or similar objects to supporting structures.

SUMMARY OF THE INVENTION

In brief, these and other objects of the invention are attained by providing a support member which includes a rigid support strap having a coating of elastomeric material applied thereto. The support member is coated during manufacture by applying the elastomer in the fluid or uncured condition and then curing the elastomer in the usual manner. For increased isolation performance, resilient strips may be mounted on the supporting surface of the support member and encapsulated by the applied layer of elastomeric material.

BRIEF DESCRIPTION OF THE DRAWING

The single figure of the accompanying drawing is a cross-sectional perspective view of a representative support member arranged as a pipe hanger in accordance with the invention.

DETAILED DESCRIPTION OF THE INVENTION

In the typical embodiment of the invention shown in the drawing, a pipe hanger 11 consists of a metal support strap portion 12 and a mating strap portion 13 which cooperate when joined to form a sleeve for the reception of a pipe 14. The strap portions 12 and 13 are joined by bolts 15 which extend through mating flanges 16, and shank 17 extending from the lower strap connects the assembly to a remote supporting member (not shown).

In accordance with the invention both strap portions are coated with a layer 18 of elastomeric material which may be applied by dipping, spraying or the like and then curing to form a resilient coating. A vibration damping means is thereby provided which has several advantages over known devices. The coating which may for example, be of the type sold under the trade names "Plasti-Cel" or "RTV," is easily applied and well suited to mass production. Thickness and durometer can be easily varied. Hand installation and adjustment of insulating material are eliminated. Moreover, if the coating is applied so as to completely cover the hanger portions, the need for galvanizing the support straps is minimized.

It will be noted that the flanges 16 and the shank 17 are coated when the elastomer is applied to the strap portions. This provides further absorption of vibration. If it were necessary to fasten the shank 17 to a supporting structure by welding, the coating on the remote portion of the shank could be removed or omitted.

To increase the resilience and further reduce transmission of vibration, the preferred embodiment of the invention shown in the drawing includes a plurality of strips 19 of resilient material which are cemented or otherwise fastened to the inner surface of the strap portions prior to application of the elastomer. With this arrangement, the elastomeric layer encapsulates the strips 19 as well as the strap portions 13 and 14. Plain rubber may be used for the strips 19. To provide additional noise damping asbestos, felt, or lead wool may be added to the strips. For very soft mounts, the strips 19 may comprise sections of rubber tubing thereby providing air springs under the elastomeric layer.

The embodiment of the invention described herein is illustrative only. Many variations and modifications may be made by one skilled in the art without departing from the spirit and the scope of the invention. All such variations and modifications, therefore, are included within the intended scope of the invention as defined by the appended claims.

We claim:
1. An isolation support comprising:
  two rigid matinng sections having concave supporting surface portions to receive a member to be supported;
  a flange attached to each end of each section, the flanges on corresponding ends of the mating sections abutting one another;
  a plurality of spaced resilient members on said concave portions;

fastening means for fastening the flanges together;
an elastomeric coating on the supporting surface portions and overlying said resilient members; and
rigid support means for the rigid structure.

References Cited

UNITED STATES PATENTS

| | | | |
|---|---|---|---|
| 2,396,837 | 3/1946 | Ellinwood | 248—74X |
| 2,539,783 | 1/1951 | Kirk | 248—62 |
| 2,706,496 | 4/1955 | Bond | 248—55X |
| 2,918,239 | 12/1959 | Wirth | 248—55 |
| 2,936,982 | 5/1960 | Cushenberry | 248—74 |
| 3,328,085 | 6/1967 | Schwartz | 248—350X |

FOREIGN PATENTS

| | | | |
|---|---|---|---|
| 1,287,586 | 2/1962 | France | 248—74 |

CHANCELLOR E. HARRIS, Primary Examiner

U.S. Cl. X.R.

248—54